US010019564B2

(12) United States Patent
Jun et al.

(10) Patent No.: US 10,019,564 B2
(45) Date of Patent: Jul. 10, 2018

(54) AUTHENTICATION OF A DEVICE

(71) Applicant: Cryptography Research, Inc., San Francisco, CA (US)

(72) Inventors: Benjamin Che-Ming Jun, Burlingame, CA (US); Matthew Evan Orzen, San Francisco, CA (US); Joel Patrick Wittenauer, Pleasanton, CA (US); Steven C. Woo, Saratoga, CA (US)

(73) Assignee: Cryptography Research, Inc., Sunnyvale, CA (US)

(*) Notice: Subject to any disclaimer, the term of this patent is extended or adjusted under 35 U.S.C. 154(b) by 50 days.

(21) Appl. No.: 14/670,379

(22) Filed: Mar. 26, 2015

(65) Prior Publication Data

US 2015/0278506 A1 Oct. 1, 2015

Related U.S. Application Data

(60) Provisional application No. 62/094,006, filed on Dec. 18, 2014, provisional application No. 61/971,731, filed on Mar. 28, 2014.

(51) Int. Cl.
*G06F 21/44* (2013.01)
*H04L 29/06* (2006.01)
*H04L 9/32* (2006.01)

(52) U.S. Cl.
CPC .............. *G06F 21/44* (2013.01); *H04L 9/321* (2013.01); *H04L 9/3271* (2013.01); *H04L 63/08* (2013.01)

(58) Field of Classification Search
CPC ....... G06F 21/44; H04L 9/321; H04L 9/3271; H04L 63/08
See application file for complete search history.

(56) References Cited

U.S. PATENT DOCUMENTS

| 8,607,045 | B2 | 12/2013 | Bailey et al. |
| 8,667,303 | B2 | 3/2014 | Nasir et al. |
| 8,711,656 | B1* | 4/2014 | Paulson ............... H04B 7/2603 367/135 |
| 9,107,055 | B2* | 8/2015 | Zerr ..................... H04W 4/206 |
| 9,154,480 | B1* | 10/2015 | Juels ...................... H04L 63/08 |
| 2006/0212701 | A1* | 9/2006 | Warwick ................ H04L 9/321 713/168 |
| 2008/0075064 | A1* | 3/2008 | Krantz .................... H04L 63/08 370/352 |
| 2009/0240814 | A1* | 9/2009 | Brubacher ............ H04W 12/04 709/227 |
| 2010/0268949 | A1* | 10/2010 | Schuetze ................ H04L 9/002 713/168 |
| 2011/0258689 | A1* | 10/2011 | Cohen .................. H04L 63/061 726/7 |

(Continued)

*Primary Examiner* — Mohammad A Siddiqi
(74) *Attorney, Agent, or Firm* — Lowenstein Sandler LLP

(57) ABSTRACT

Pairing data associated with a second device may be received at a first device. The pairing data may be received from a server. A first authentication proof may be generated based on the pairing data received from the server. A second authentication proof may be received from the second device. Furthermore, an authentication status of the second device may be updated based on a comparison of the first authentication proof that is based on the pairing data received from the server and the second authentication proof that is received from the second device.

20 Claims, 11 Drawing Sheets

(56) References Cited

U.S. PATENT DOCUMENTS

| | | | |
|---|---|---|---|
| 2011/0313922 A1* | 12/2011 | Ben Ayed | G06Q 20/108 705/42 |
| 2012/0131230 A1 | 5/2012 | Ady et al. | |
| 2012/0201381 A1* | 8/2012 | Miller | H04L 9/16 380/255 |
| 2012/0284413 A1* | 11/2012 | Miura | G06F 21/445 709/227 |
| 2013/0095753 A1* | 4/2013 | Chen | H04B 5/00 455/41.1 |
| 2013/0152160 A1* | 6/2013 | Smith | G06F 21/604 726/1 |
| 2014/0075054 A1 | 3/2014 | Lydon et al. | |
| 2014/0096212 A1* | 4/2014 | Smith | G06F 21/34 726/7 |
| 2014/0104638 A1 | 4/2014 | Kato | |
| 2014/0208384 A1* | 7/2014 | Youssefian | H04L 63/0884 726/3 |
| 2015/0180842 A1* | 6/2015 | Panther | H04L 63/0464 713/153 |
| 2015/0237502 A1* | 8/2015 | Schmidt | H04W 12/10 726/7 |
| 2015/0371214 A1* | 12/2015 | Schroder | H04L 63/0838 705/44 |

* cited by examiner

AUTHENTICATION OF A DEVICE

RELATED APPLICATIONS

This application claims the benefit under 35 U.S.C. § 119(e) of U.S. Provisional Application 62/094,006 filed on Dec. 18, 2014 and U.S. Provisional Application No. 61/971,731 filed on Mar. 28, 2014, which are hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
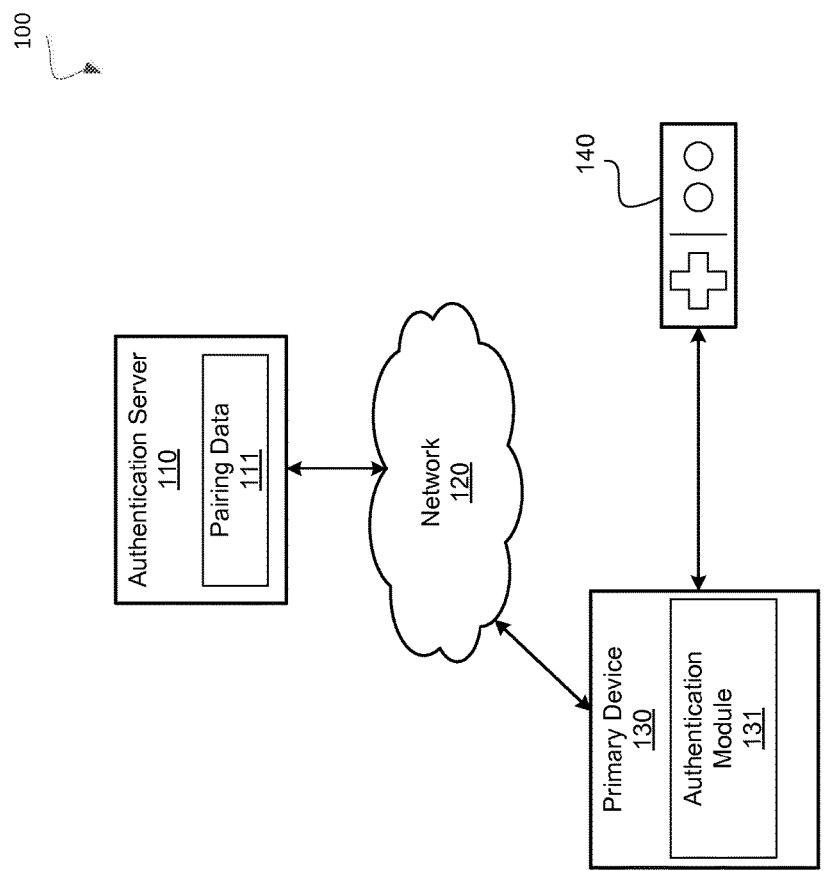
FIG. 1 illustrates an environment associated with the authentication of a device in accordance with some embodiments.

Aspects of the present disclosure are directed to authenticating a device. A primary device (i.e., a master device) may interact with a secondary device (i.e., a slave device or a peripheral device). The secondary device may be a type of controller associated with the primary device. For example, the secondary device may be, but is not limited to, a console controller, joystick, video game controller, remote control, or other such device and the primary device may be, but is not limited to, an entertainment console, video game console, television, or other such device. As another example, the primary device may be a printer and the secondary device may be a printer cartridge.

The use of the secondary device may be based on an authentication of the secondary device with the primary device. For example, each of the secondary device and the primary device may generate authentication information. The secondary device may transmit its authentication information to the primary device and the primary device may compare its generated authentication information with the authentication information received from the secondary device. If the authentication information generated by the primary device matches the authentication information generated by the secondary device, then the primary device may successfully authenticate the secondary device. In response to the successful authentication, features or capabilities of the secondary device may be enabled. For example, the secondary device may be able to interact with the primary device. However, if the authentication information generated by the secondary device does not match the authentication information generated by the primary device, then the primary device may not successfully authenticate the secondary device and, in response, one or more features or capabilities of the secondary device may not be enabled. For example, the secondary device may not be able to interact with the primary device.

The authentication information may include a proof and a cryptographic check. Each of the proof and the cryptographic check may be generated by a cryptographic function. Furthermore, the proof and the cryptographic check may be based on an output value of another cryptographic function. Such a cryptographic function may be implemented in hardware or circuitry that is located in a secondary device. The primary device may not include such hardware or circuitry and may receive the output value from a server via a network connection (e.g., the output value is pre-computed from the cryptographic function by the server). The secondary device may then generate the proof and the cryptographic check by generating the output value while the primary device may generate the proof and the cryptographic check from the output value received from the server (e.g., the primary device may not generate the output value). However, in alternative embodiments as described in further detail, each of the primary device and the secondary device may receive an output value from the server as well as include the hardware or circuitry to generate the output value. As such, a device may generate cryptographic values based on data received from a server (e.g., as described by the primary device) or may generate the cryptographic values without receiving data from the server (e.g., as described by the secondary device). In some embodiments, the server may generate the cryptographic values (e.g., the proof and cryptographic check).

A comparison of the proof and the cryptographic check that are generated based on the output value received from the server with the proof and the cryptographic check that are generated based on the output value that is generated by the hardware or circuitry of the secondary device may be performed. If the proofs and the cryptographic checks are identical, then the secondary device may be successfully authenticated with the primary device and functionality or capabilities of the secondary device may be unlocked or enabled in association with the primary device (e.g., the secondary device may be allowed to interact with the primary device).

As an example, the successful authentication of a video game controller (e.g., the secondary device) with a video game console (e.g., the primary device) may result in the video game controller being able to control game play of the video game console. In another example, the successful authentication of a printer cartridge (e.g., the secondary device) with a printer (e.g., the primary device) may result in the printer being able to use the printer cartridge in printing operations. The authentication of the secondary device with the primary device may result in the use of the secondary device only when the primary device has successfully authenticated the secondary device. For example, if the secondary device is used with an unauthorized primary device (e.g., a printer attempts to use a printer cartridge intended for a different printer or a video game console attempts to use a video game console controller intended for a different video game console), then the secondary device may not be successfully authenticated by the unauthorized primary device. Accordingly, the present disclosure may ensure that secondary devices may not be used with unauthorized primary devices.

FIG. 1 illustrates an environment 100 associated with the authentication of a device. In general, the environment 100 may include an authentication server 110, a primary device 130 including an authentication module 131, and a secondary device 140. The authentication module 131 may receive a request for the secondary device 140 to be authenticated by the primary device 130 and, in response, the authentication module 131 may receive pairing data 111 at the authentication server 110 via the network 120. The pairing data 111 may then be used to authenticate the secondary device 140.

As shown in FIG. 1, the environment 100 may include a primary device 130 and a secondary device 140. The primary device 130 may include an authentication module 131 that may authenticate the secondary device 140. Authentication of the secondary device 140 may refer to a verification that the secondary device 140 may be used with the primary device 130 or that particular functionality or capability of the secondary device 140 may be enabled. The secondary device 140 may be a device that interacts with the primary device 130 (e.g., a type of controller) or a device that is used by the primary device 130 (e.g., a printer cartridge). When the secondary device 140 is to be used, the secondary device 140 may transmit a request to authenticate with the primary device 130. In response to the request, the authentication module 131 may authenticate the secondary device 140 based on pairing data 111 that is retrieved from the authentication server 110 over the network 120. An authentication status for the secondary device 140 may be updated to identify a successful authentication with the primary device 130. In some embodiments, information indicating a successful authentication may be transmitted to the secondary device 140 and a portion of the secondary device 140 (e.g., a processing device or other such circuitry) may enable a functionality or capability for the secondary device 140.

The authentication module 131 may retrieve the pairing data 111 and perform one or more cryptographic functions or operations to generate a proof based on a portion of the pairing data. Another portion of the pairing data that is received from the authentication server 110 may be transmitted to the secondary device 140. Furthermore, the secondary device 140 may perform multiple cryptographic functions or operations to generate another proof based on the portion of the pairing data received from the authentication server 110 via the primary device 130 as well as additional information stored at the secondary device (e.g., a key). Subsequently, the secondary device 140 may transmit its proof to the primary device 130 and if the proof generated by the authentication module 131 of the primary device 130 matches the proof generated by the secondary device 140, then the authentication module 131 may update an authentication status of the secondary device 140 (e.g., from unauthenticated to authenticated) and/or may transmit authentication status information to the secondary device 140 that verifies that the secondary device 140 has been successfully authenticated. In response to the successful authentication, the secondary device 140 may then be configured or enabled to access some functionality or capability of the primary device 130 (e.g., the secondary device 140 may be able to interact with the primary device 130 or the secondary device 140 may be able to be used by the primary device 130).

As such, the primary device 130 may receive pairing data in response to a request to authenticate a secondary device 140. The primary device 130 may retrieve pairing data 111 from the authentication server 110. A portion of the authentication data may be used to generate a proof by the primary device 130. Another portion of the pairing data 111 may be transmitted from the primary device 130 to the secondary device 140 and may be used to generate another proof by the secondary device 140 which may subsequently be transmitted to the primary device 130. If the proof generated by the primary device 130 matches the proof generated by the secondary device 140, then the secondary device 140 may be successfully authenticated and be able to access certain functionality or capability of the primary device 130. However, if the proof generated by the primary device 130 does not match the proof generated by the secondary device 140, then the secondary device 140 may not be successfully authenticated and may not be able to access certain functionality or capability of the primary device 130.

In some embodiments, the network 120 may be a public network (e.g., the Internet), a private network (e.g., a local area network (LAN) or a wide area network (WAN)), or a combination thereof. Network 140 may include a wireless infrastructure, which may be provided by one or multiple wireless communications systems, such as a wireless fidelity (WiFi) hotspot connected with the network 140 and/or a wireless carrier system that may be implemented using various data processing equipment, communication towers, etc. Furthermore, the authentication sever 110 may include, but is not limited to, any data processing device such as a desktop computer, a laptop computer, a mainframe computer, a personal digital assistant, a rack-mount server, a hand-held device, or any other device configured to process data. The authentication server 110 may be coupled to the primary device 130 through the network 120. Furthermore, the primary device 130 and the secondary device 140 may further include, but is not limited to, any data processing device.

Figure 2:
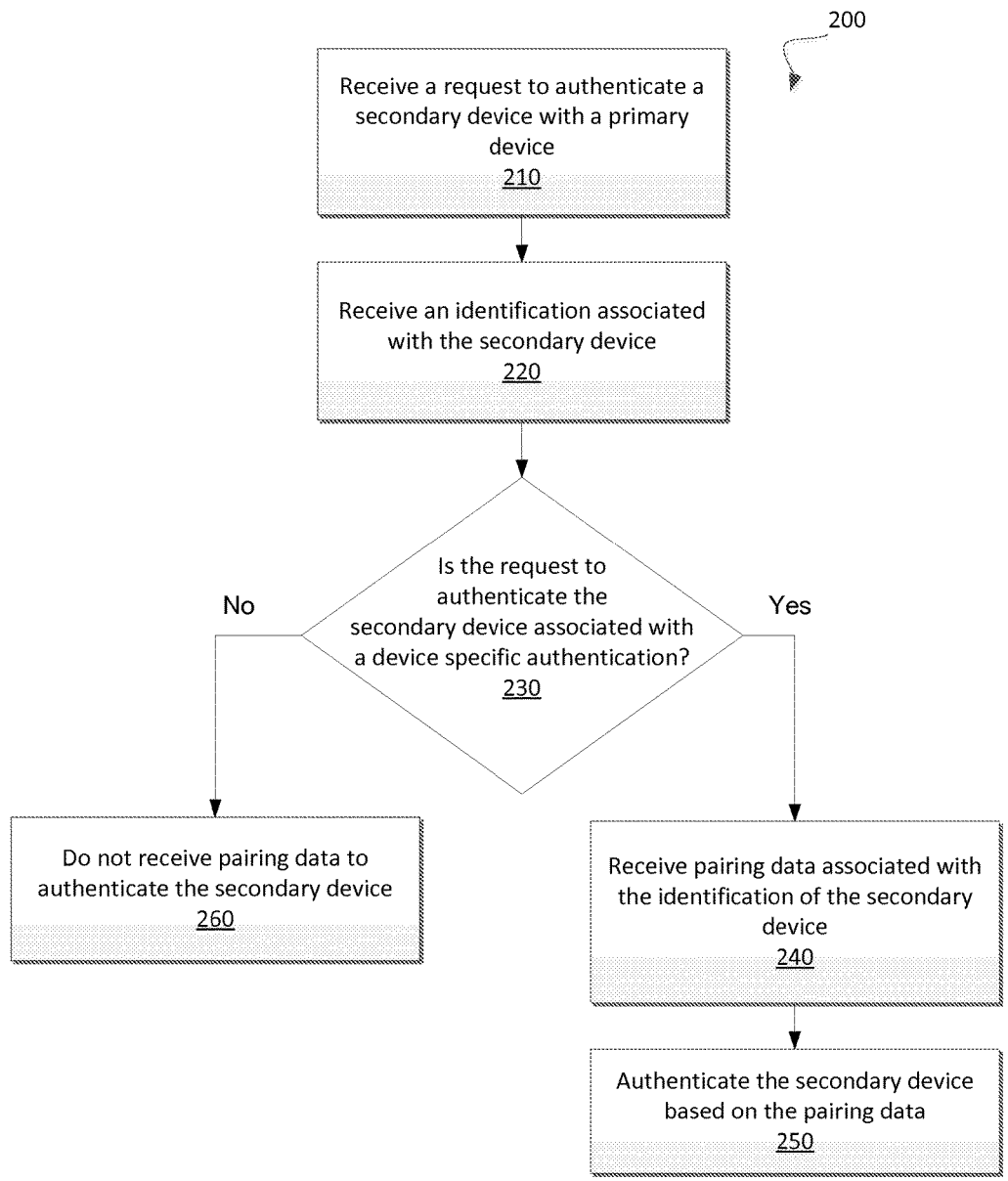
FIG. 2 is a flow diagram of an example method to authenticate a device based on a device specific authentication in accordance with some embodiments of the present disclosure.

FIG. 2 is a flow diagram of an example method 200 to authenticate a device based on a device specific authentication. In general, the method 200 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the authentication module 131 of FIG. 1 may perform the method 200.

As shown in FIG. 2, the method 200 may begin with the processing logic receiving a request to authenticate a secondary device with a primary device (block 210). For example, a primary device may receive a request from the secondary device when the secondary device is powered on, attempts to interact with the primary device, or when the secondary device is to be used. The processing logic may receive an identification associated with the secondary device (block 220). For example, the secondary device may transmit a unique identification (e.g., a device specific identification) that is only associated with the secondary device. In some embodiments, the unique identification may be a device specific key stored in a memory of the secondary device. Furthermore, the processing logic may determine if the request to authenticate the secondary device is associated with a device specific authentication (block 230). For example, the secondary device may include hardware and/or software functionality and capability to interact with a primary device, but a portion of the hardware and/or software functionality and capability that is enabled or unlocked may be different for other secondary devices. In some embodiments, the secondary device may include some functionality and capability where a subset of the functionality and capability of the secondary device with the primary device may be accessed, enabled, or unlocked after a successful authentication of the secondary device. If the request to authenticate the secondary device is not associated with a device specific authentication, then pairing data may not be received to authenticate the secondary device (block 260). For example, the primary device may not transmit a request to receive pairing data when the request to authenticate the secondary device is not associated with the device specific authentication. In some embodiments, the secondary device may be authenticated based on information already stored on the primary device (e.g., a key or other such information stored in the primary device). However, if the request to authenticate the secondary device is associated with the device specific authentication (e.g., the secondary device is attempting to access functionality or capability requiring device specific authentication), then pairing data that is associated with the identification of the secondary device may be received. As such, the pairing data may be used to authenticate a specific secondary device that is requesting a device specific authentication. In some embodiments, the pairing data that is received may be based on a specific primary device and a specific secondary device. For example, the pairing data may only be used to authenticate a specific secondary device with a specific primary device. The processing logic may authenticate the secondary device based on the pairing data (block 250). Further details with regard to authenticating the secondary device are disclosed in conjunction with FIGS. 3-8.

Figure 3:
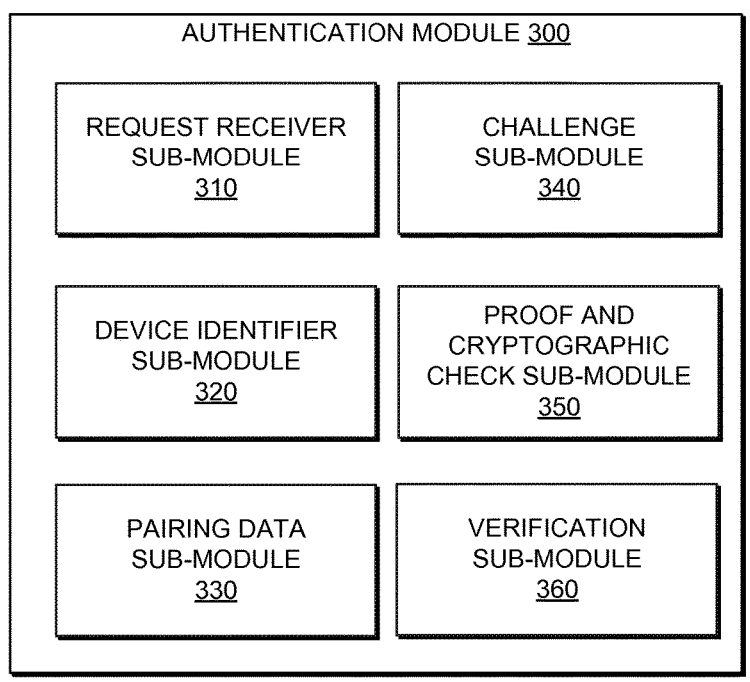
FIG. 3 is a block diagram of an authentication module to authenticate a device in accordance with some embodiments.

FIG. 3 is a block diagram of an authentication module 300 to authenticate a device. The authentication module 300 may include a request receiver sub-module 310, a device identifier sub-module 320, a pairing data sub-module 330, a challenge sub-module 340, a proof and cryptographic check sub-module 350, and a verification sub-module 360. In alternative embodiments, the functionality of one or more of the modules may be combined or divided. Furthermore, the authentication module 300 may correspond to the authentication module 131 of FIG. 1.

As shown in FIG. 3, the authentication module 300 may include a request receiver sub-module 310 that may receive an authentication request from a secondary device. For example, the request receiver sub-module 310 may receive the authentication request when the secondary device seeks to access functionality or capability to interact with the primary device that requires authentication by the primary device. The device identifier sub-module 320 may receive an identification (ID) of the secondary device. The identification of the secondary device may be a unique device ID that is only assigned to one secondary device. In some embodiments, the identification may be based on a unique key that is only stored on one secondary device. The pairing data sub-module 330 may retrieve pairing data from an authentication server when the authentication request received from the secondary device is associated with a device specific authentication. For example, the pairing data sub-module 330 may transmit a request to the authentication server for pairing data that corresponds to the identification of the secondary device when the authentication request corresponds to the enabling of particular functionality or capability of the secondary device.

Furthermore, the authentication module 300 may include a challenge sub-module 340 to receive a first challenge information or data and to generate, select, or receive a second challenge information data. In some embodiments, the first challenge information and the second challenge information may be based on randomly generated numbers. In alternative embodiments, the first challenge information and the second challenge information may be based on information associated with the secondary device (e.g., personal data associated with a user of the secondary device). In some embodiments, the first challenge information and/or the second challenge information may be based on information associated with the primary device. For example, the first or second challenge information may be based on a social security number, billing information, or other such information associated with the secondary device or a user of the secondary device. The first challenge information may be based on randomly generated numbers and the second challenge information may be based on information associated with the secondary device, or vice versa. Furthermore, the first challenge information may be identified from the pairing data received by the pairing data sub-module 330. The second challenge information may be randomly generated by the challenge sub-module 340 or selected by the challenge sub-module 340. Furthermore, the challenge sub-module 340 may transmit the second challenge information to the secondary device. For example, if the second challenge information is randomly generated by the authentication module 300 of a primary device, then the second challenge information may be transmitted to the secondary device. In alternative embodiments, the first challenge information may be generated by or received from the primary device 130 or the secondary device 140. The authentication server may receive the first challenge information from the primary device 130 or the secondary device 140 and may generate the pairing data based on the received first challenge information.

The authentication module 300 may include a proof and cryptographic check (CCK) sub-module 350 to generate authentication information. For example, the generated authentication information may include a proof and the CCK. In some embodiments, the CCK may be a value that is less in size and takes less computational time to generate than the proof. The proof and the CCK from a primary device may be generated based on a portion of the pairing data. Furthermore, the proof and cryptographic check sub-module 350 may transmit the CCK to the secondary device and the secondary device may transmit a second proof to the cryptographic check sub-module 350 if its generated CCK matches the CCK generated by the authentication module 300 of the primary device. Furthermore, the verification sub-module 360 may compare the second proof from the secondary device with the proof generated by the cryptographic sub-module 350. The verification sub-module 360 may update an authentication status of the secondary device based on the comparison of the proofs. For example, the authentication status of the secondary device may be updated from unauthenticated to authenticated by the primary device (e.g., a memory of the primary device or other such status identifier by the primary device may be updated). In some embodiments, the primary device may transmit authentication status information to the authentication server. For example, the primary device may transmit information identifying that the secondary device has been successfully authenticated or has failed to be authenticated. Upon a successful authentication of the secondary device, the authentication server may subsequently not provide the corresponding pairing data of the secondary device to any other primary device to authenticate the secondary device unless the primary device un-pairs or disconnects with the secondary device (e.g., in response to the entering of a password or passcode). In response to an unsuccessful authentication, the authentication server may not allow subsequent authentication of the secondary device (e.g., ban or 'black list' the secondary device) from certain functionality or capability. For example, after an unsuccessful authentication, the secondary device may not be allowed to authenticate with any primary device.

Figure 4:
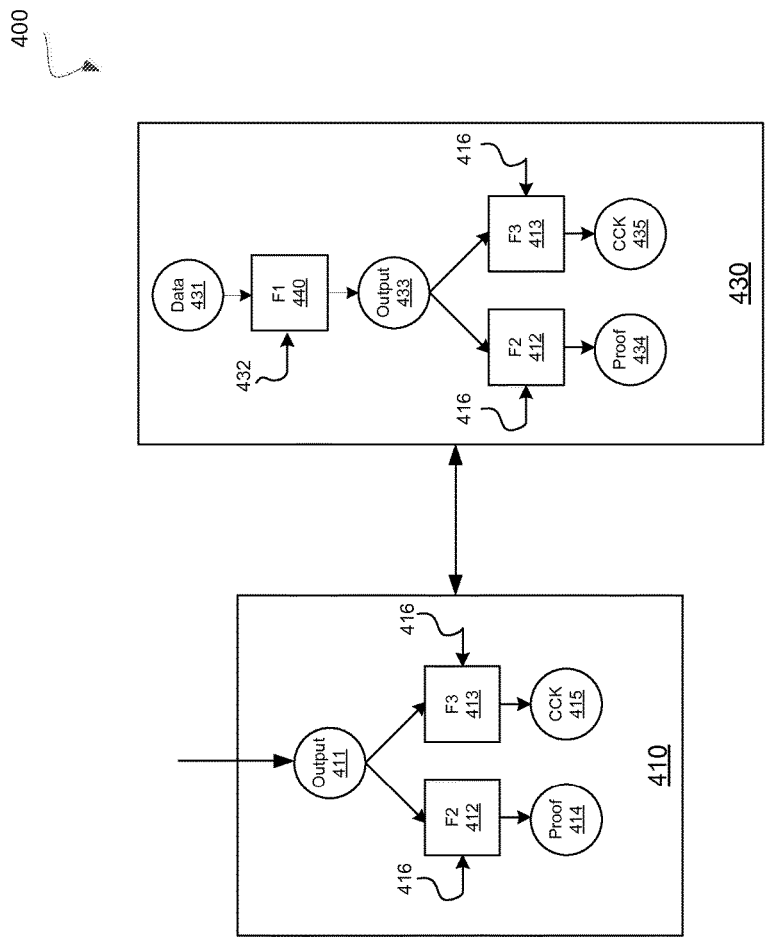
FIG. 4 illustrates an example environment of a primary device and a secondary device in accordance with some embodiments.

FIG. 4 illustrates an example environment 400 of a primary device and a secondary device. In general, the environment 400 may include a primary device 410 (e.g., primary device 130) interacting with a secondary device 430 (e.g., secondary device 140). The secondary device 430 may be referred to as a prover and the primary device 410 may be referred to as a verifier (e.g., the primary device verifies authentication information from the secondary device).

As shown in FIG. 4, the primary device 410 and the secondary device 420 may include various cryptographic operations or functions. For example, each of the primary device 410 and the secondary device may include a second cryptographic function 412 and a third cryptographic function 413. The primary device 410 may receive an output value 411. For example, the output value 411 may be received as a portion of pairing data from a server. The pairing data may include a first challenge data 432 and the output value 411. The primary device 410 may perform an operation based on the second cryptographic function 412 to generate a cryptographic proof 414 based on the output 411 and a second challenge information or data 416. In some embodiments, the second challenge information or information 416 may be a randomly generated number that is generated by the primary device 410. In alternative embodiments, the second challenge information 416 may be data that is selected or determined based on the secondary device 430 (e.g., information of a user of the secondary device). The primary device 410 may perform further operations based on the third cryptographic function 413 to generate the cryptographic check (CCK) 415 based on the second challenge information 416 and the output value 411. As such, the CCK 415 generated by the primary device 410 is based on at least a portion of the pairing data (e.g., the output value 411).

The secondary device 430 may store a key 431 stored in a memory. The key 431 may be stored in a one time programmable (OTP) memory. The key 431 may be a unique device specific key that is only stored in the memory of the secondary device 430 (e.g., the key 431 is not stored or associated with other secondary devices). In some embodiments, the key may be securely stored in a portion of the secondary device 430 and is not passed or transmitted between other components of the secondary device 430. The secondary device 430 may include a first cryptographic function 440 that receives the first challenge data 432 from the primary device 410 (e.g., the primary device 410 transmits the first challenge information 432 to the secondary device 430) and may use the key 431 to generate the output value 433. The secondary device 430 may further include the same second cryptographic function 412 (as the primary device 410) to receive the output value 433 and the second challenge information 416 to generate the proof 434 and the same cryptographic function 413 to receive the output value 433 and the second challenge information 416 to generate the cryptographic check 435. As such, the secondary device 430 includes the first cryptographic function 440 to generate the output value 433 based on the key 431 and the first challenge information 432 that is received from the primary device 410 (e.g., transmitted from the authentication server in pairing data to the primary device 410 and then to the secondary device 430). If the output value 433 is identical to the output value 411 (e.g., the first cryptographic function performed on the key 431 and the first challenge information 432 produces the same value as the output value 411), then the second cryptographic function 412 and the third cryptographic function 413 of the secondary device 430 may generate the same proof 434 and CCK 435 as the primary device 410. For example, the proof 414 would be identical to the proof 434 and the CCK 415 would be identical to the CCK 435. However, if the output value 433 is not identical to the output value 411, then the second cryptographic function 412 and the third cryptographic function 413 of the secondary device 430 may not generate the same proof 434 and CCK 435 as the primary device 410.

In some embodiments, the cryptographic functions 412, 413, and 440 may be implemented in circuitry, software, or a combination thereof. The cryptographic functions 412, 413, and 440 may correspond to advanced encryption standard (AES) functions or any other cryptographic function that produces an output based on a combination of a first and second input. In some embodiments, the first cryptographic function 440 may be implemented in hardware or circuitry of the secondary device. For example, the first cryptographic function 440 may operate as a keyed block cypher or keyed cryptographic operation. Furthermore, as described above, the primary device 410 may receive pairing data that includes the first challenge data 432 and the output value 411. The secondary device 430 may generate the output value 431 that matches the output value 411 that is received by the primary device 410 via a network from a server.

Figure 5A:
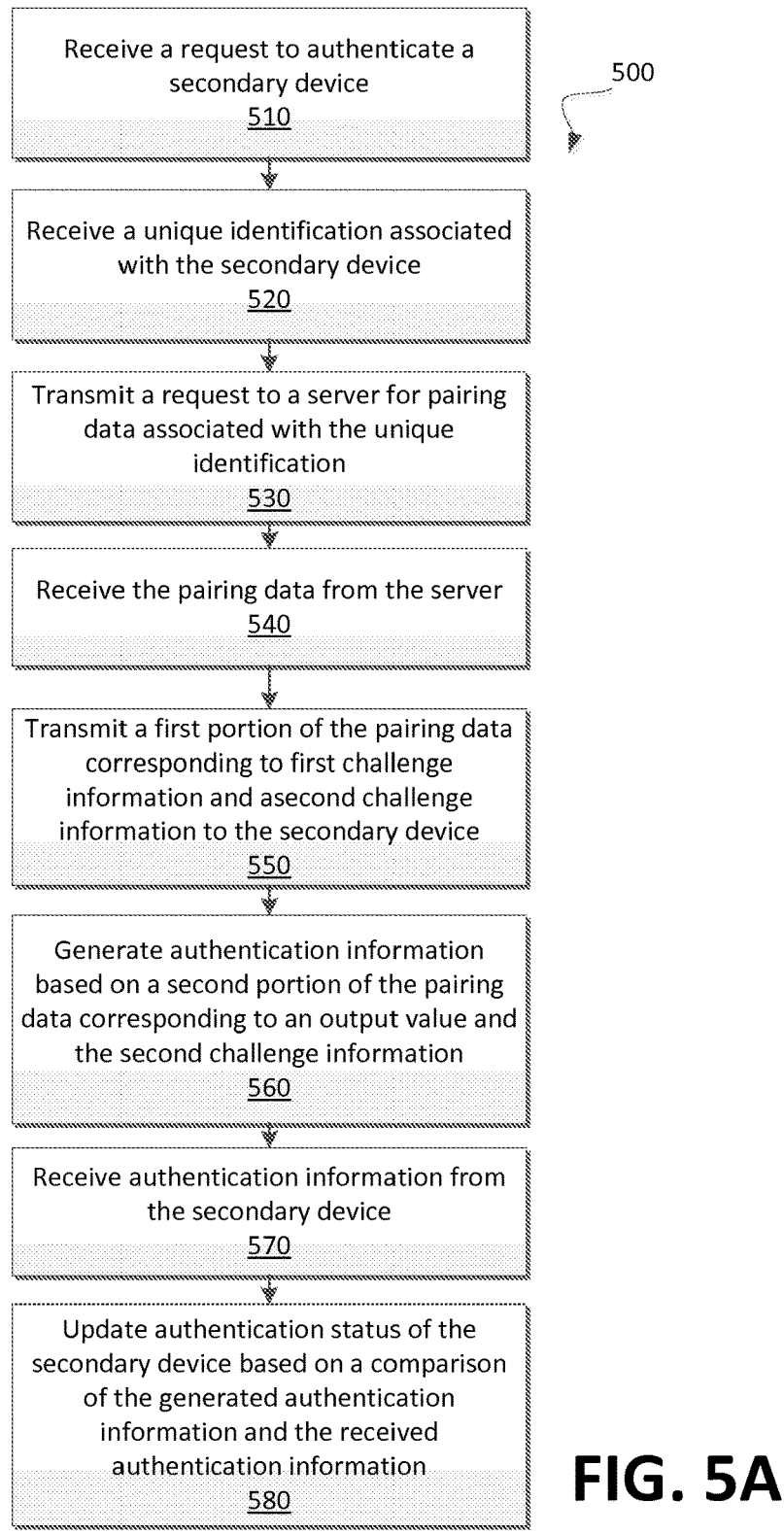
FIG. 5A is a flow diagram of an example method to authenticate a device based on pairing data in accordance with some embodiments of the present disclosure.

FIG. 5A is a flow diagram of an example method 500 to authenticate a device based on pairing data. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. The authentication module 131 of FIG. 1 or the authentication module 300 of FIG. 3 may perform the method 500. In some embodiments, the method 500 may be performed by an authentication module of a primary device 130 or 410 of FIGS. 1 and 4.

As shown in FIG. 5A, the method 500 may begin with the processing logic receiving a request to authenticate a secondary device (block 510). The processing logic may further receive a unique identification associated with the secondary device (block 520). For example, the received request to authenticate the secondary device may include a unique identification (e.g., a serial number or other such ID) of the secondary device or the secondary device may return an ID in response to a request for the ID. The processing logic may transmit a request to a server (e.g., an authentication server) for pairing data associated with the unique ID of the secondary device (block 530). For example, the server may include pairing data for multiple secondary devices and may select one pairing data based on the identification of the secondary device requesting authentication by a particular primary device. The processing logic may further receive the pairing data from the server (block 540). For example, the primary device may receive one pairing data from a plurality of pairing data that are stored or generated at the server. Furthermore, the processing logic may transmit a first portion of the pairing data corresponding to a first challenge information and may further transmit second challenge information to the secondary device (block 550). In some embodiments, the first and second challenge information may each be randomly generated numbers or the first challenge information may be a randomly generated number and the second challenge information may not be a randomly generated number. In another embodiment, the first challenge information may be generated by the server and the second challenge information may be generated by either the primary device or the secondary device. The first challenge information and the second challenge information may each be a value that is used by the secondary device to generate a proof and a CCK. As such, the proof and the CCK that is generated by the secondary device may be generated based on a portion of the pairing data (e.g., the first portion corresponding to first challenge information) as well as additional information or data that is not in the pairing data and that is generated or selected by the primary device (e.g., the second challenge information). The processing logic may further generate authentication information based on a second portion of the pairing data and the second challenge information (block 560). For example, the primary device may generate a proof and a CCK based on a second portion of the pairing data (e.g., an output value) and the second challenge information. The processing logic may further receive authentication information from the secondary device (block 570). For example, the primary device may receive a proof and a CCK from the secondary device that is generated based on a key stored at the secondary device, the first challenge information received by the primary device from the authentication server and transmitted from the primary device to the secondary device, and the second challenge information that is generated or selected by the primary device and transmitted to the secondary device. The processing logic may further update an authentication status of the secondary device based on a comparison of the generated authentication information and the received authentication information (block 580). For example, the primary device may respond to commands or operations from the secondary device if the proof generated by the primary device matches the proof generated by the secondary device and received by the primary device.

Figure 5B:
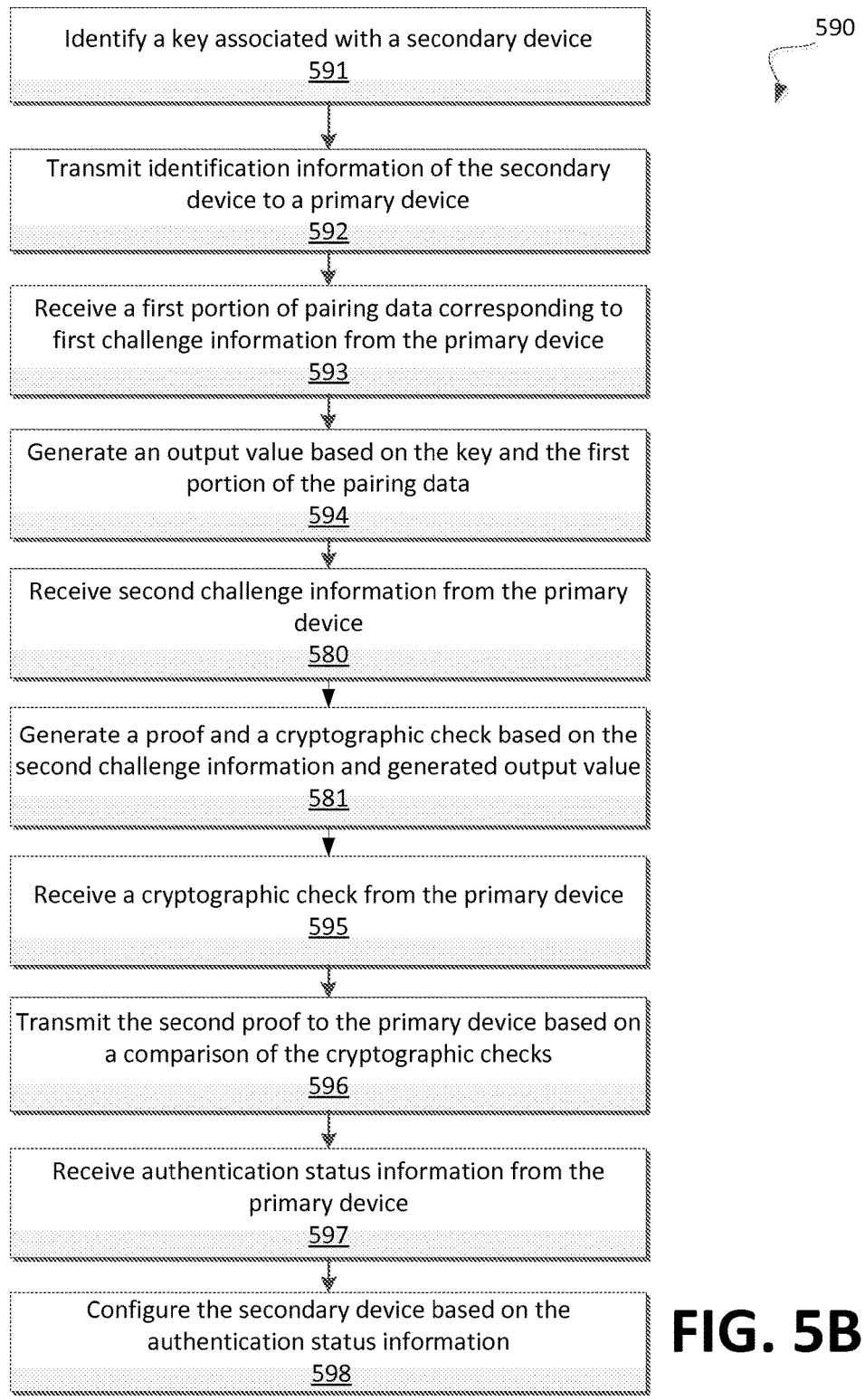
FIG. 5B is a flow diagram of an example method to configure a device based on authentication status information in accordance with some embodiments of the present disclosure.

FIG. 5B is a flow diagram of an example method 590 to configure a device based on authentication status information. In general, the method 590 may be performed by processing logic that may comprise hardware (e.g., processing device, circuitry, dedicated logic, programmable logic, microcode, hardware of a device, etc.), software (e.g., instructions run or executed on a processing device), or a combination thereof. The authentication module 131 of FIG. 1 or the authentication module 300 of FIG. 3 may perform the method 590. In some embodiments, the method 590 may be performed by a secondary device 140 or 430 of FIGS. 1 and 4.

As shown in FIG. 5B, the method 590 may begin with the processing logic identifying a key associated with a secondary device (block 591). For example, a key stored in a memory of the secondary device may be identified or received. The key may be a device specific key that is only associated with the secondary device and is not associated with any other secondary devices. The processing logic may transmit identification information of the secondary device to a primary device (block 592). The identification information may be a unique identification of the secondary device. The processing logic may further receive a first portion of pairing data that corresponds to first challenge information from the primary device (block 593). Furthermore, the processing logic may generate an output value based on the key and the first portion of the pairing data (block 594). For example, a first cryptographic function may be performed based on inputs of the key and the first challenge information. The processing logic may further receive second challenge information from the primary device (block 580). For example, the secondary device may receive a second challenge information that is randomly generated by the primary device. The processing logic may further generate a proof and a CCK based on the second challenge information and the generated output (block 581). For example, a second cryptographic function based on input values of the second challenge information and the output value that is based on the key and the first portion of the pairing data may generate the proof. Furthermore, a third cryptographic function based on input values of the second challenge information and the output value may be used to generate the CCK. In some embodiments, the second and third cryptographic functions may be identical to the second and third cryptographic functions of the primary device that are used to generate the proof and the CCK by the primary device. The processing logic may receive a cryptographic check from the primary device (block 595). The cryptographic check that is received from the primary device may be based on pairing data as previously described. Furthermore, the processing logic may transmit the proof generated by the secondary device to the primary device based on a comparison of the cryptographic check (CCK) received from the primary device with the CCK generated by the secondary device (block 596). For example, the proof generated by the secondary device may be transmitted to the primary device when the CCK generated by the secondary device matches the CCK received from the primary device. However, the proof generated by the secondary device may not be transmitted to the primary device when the CCK generated by the secondary device does not match the CCK received from the primary device. Accordingly, the secondary device may authenticate or verify the pairing data that is received by a primary device based on a comparison of the cryptographic checks before transmitting the proof generated by the secondary device to the primary device. For example, the secondary device may compare the cryptographic check that is generated by the primary device from the output value of the received pairing data with the cryptographic check that is generated by the secondary device. If the cryptographic checks match, then the pairing data may be considered to be authenticated or valid and the secondary device may transmit its generated proof to the primary device. However, if the cryptographic checks do not match, then the pairing data may not be considered to be authenticated or valid and the secondary device may not transmit its generated proof to the primary device.

The processing logic may further receive an authentication status information from the primary device (block 597). For example, the authentication status information may correspond to whether the authentication of the secondary device has been successfully verified. The processing logic may configure the secondary device based on the authentication status information (block 598). For example, functionality or capability of the secondary device may be enabled or unlocked (e.g., able to be accessed) when the authentication status information from the primary device identifies that the secondary device has been successfully verified. In some embodiments, the secondary device may store its own authentication status and may update its own authentication status in response to receiving the authentication status information from the primary device. If the authentication status of the secondary device is updated to indicate a successful authentication of the secondary device by the primary device (e.g., the authentication status information from the primary device indicates a successful authentication based on a comparison of the proof generated by the primary device and the proof generated by the secondary device), then the secondary device may be enabled to access a functionality or capability of the secondary device. However, if the primary device does not successfully authenticate the secondary device and transmits authentication status information that indicates an unsuccessfully authenticated secondary device, then the secondary device may update its own authentication status to reflect that it has not been successfully authenticated. The secondary device may then be disabled to access a functionality or capability of the secondary device. For example, if the authentication status of the secondary device changes from indicating a successful authentication to indicating an unsuccessful authentication, then a functionality or capability of the secondary device may be disabled (e.g., restricted from being accessed or performed). Accordingly, the secondary device may maintain its own authentication status and may update its authentication status in response to receiving information from the primary device that is based on a comparison of a proof generated by the primary device and a proof generated by the secondary device.

As such, the primary device may receive pairing data that includes a first portion corresponding to first challenge information and a first output value that is generated by a server from a first cryptographic function. The primary device may generate second challenge information and may then generate a proof based on a cryptographic function with inputs as the first output value received from the server and the second challenge information. The secondary device may generate a second output value based on a stored key as well as the first challenge information from the primary device. The secondary device may further generate a second proof based on the same cryptographic function with inputs as the second output value that the secondary device generated as well as the second challenge information received from the primary device. The secondary device may then transmit the second proof to the primary device and if the second proof matches the first proof, then the primary device may transmit authentication status information indicating a successful authentication to the secondary device. In some embodiments, processing logic of the secondary device may then be configured to enable certain functionality or capability of the secondary device.

Figure 6:
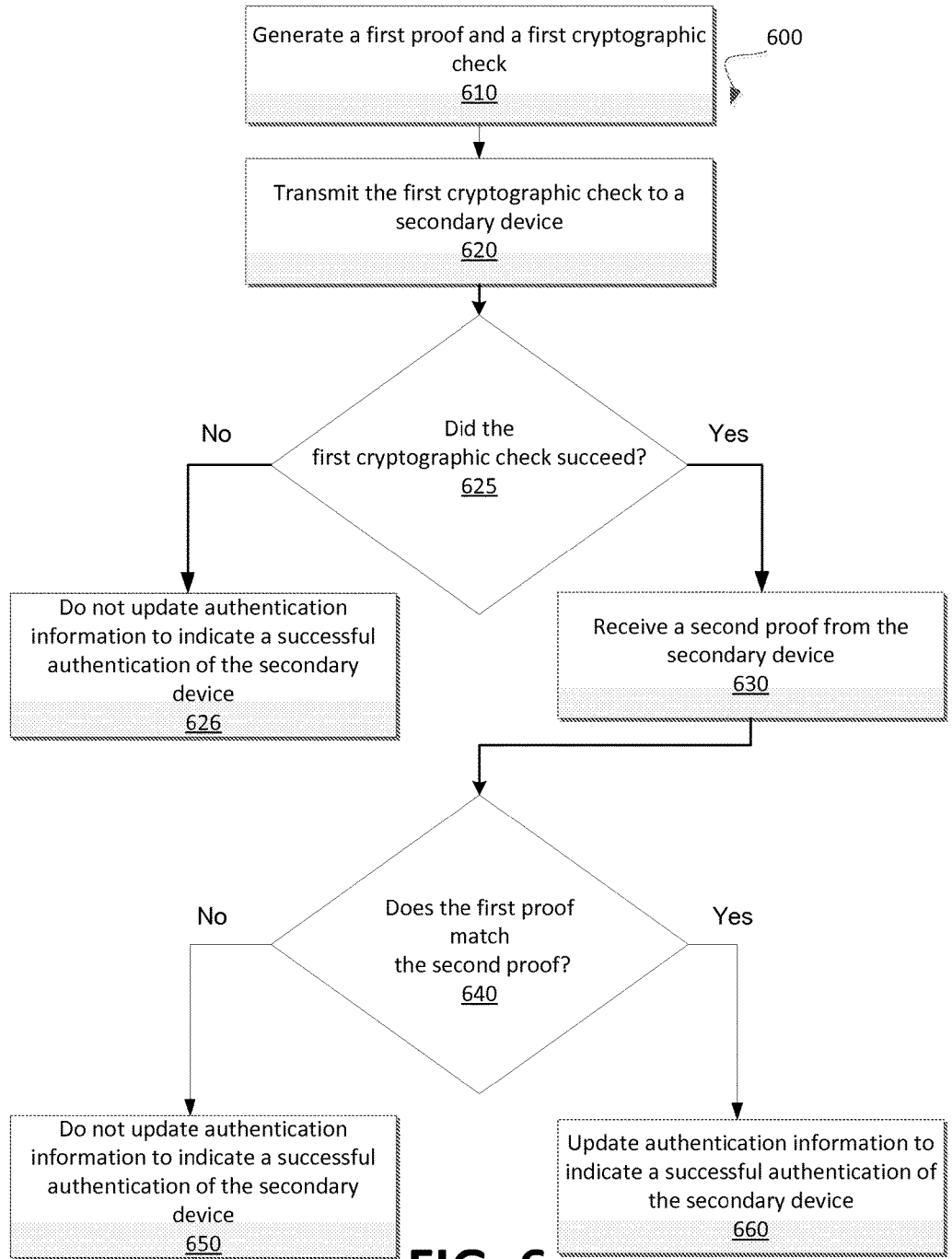
FIG. 6 is a flow diagram of an example method to authenticate a device based on a proof associated with pairing data in accordance with some embodiments.

FIG. 6 is a flow diagram of an example method 600 to authenticate a device based on a proof associated with pairing data in accordance with some embodiments. In general, the method 600 may be performed by processing logic that may comprise hardware (e.g., processing device, circuitry, dedicated logic, programmable logic, microcode, hardware of a device, etc.), software (e.g., instructions run or executed on a processing device), or a combination thereof. The authentication module 131 of FIG. 1 or the authentication module 300 of FIG. 3 may perform the method 600. In some embodiments, the method 600 may be performed by an authentication module of a primary device 130 or 410 of FIGS. 1 and 4.

As shown in FIG. 6, the method 600 may begin with the processing logic generating a first proof and a first cryptographic check (block 610). For example, the primary device may generate a first proof based on a second cryptographic function and the first cryptographic check based on a second cryptographic function that are each based on input values corresponding to an output value received from pairing data and second challenge information. The processing logic may further transmit the first cryptographic check to a secondary device (block 620). In response to the transmission of the first cryptographic check, the processing logic may determine if the first cryptographic check succeeded (block 625). For example, the first cryptographic check may be considered to have succeeded if the first cryptographic check matches a second cryptographic check generated by the secondary device. If the first cryptographic check did not succeed (e.g., the first cryptographic check failed since it did not match the second cryptographic check generated by the secondary device), then authentication information may not be updated to indicate a successful authentication of the secondary device (block 626). For example, an authentication status of the secondary device may remain as unauthenticated. If the first cryptographic check did succeed, then the processing logic may receive a second proof from the secondary device (block 630). For example, if the first cryptographic check matches a second cryptographic check generated by the secondary device based on the second cryptographic function with input values of an output value that was generated by the secondary device (e.g., with the first cryptographic function) and a first challenge information from the pairing data, then the primary device may receive the second proof from the secondary device. The processing logic may determine if the first proof matches the second proof (block 640). If the first proof generated by the primary device does not match the second proof generated by the secondary device, then authentication information may not be updated to indicate a successful authentication of the secondary device (block 650). However, if the first proof generated by the primary device does match the second proof generated by the secondary device, then authentication information may be updated to indicate a successful authentication of the secondary device (block 660). For example, an authentication status of the secondary device may be changed by the primary device from unauthenticated to authenticated so that the primary device may respond to certain commands or operations from the secondary device. In some embodiments, information indicating the successful authentication may be transmitted from the primary device to the secondary device.

Figure 7A:
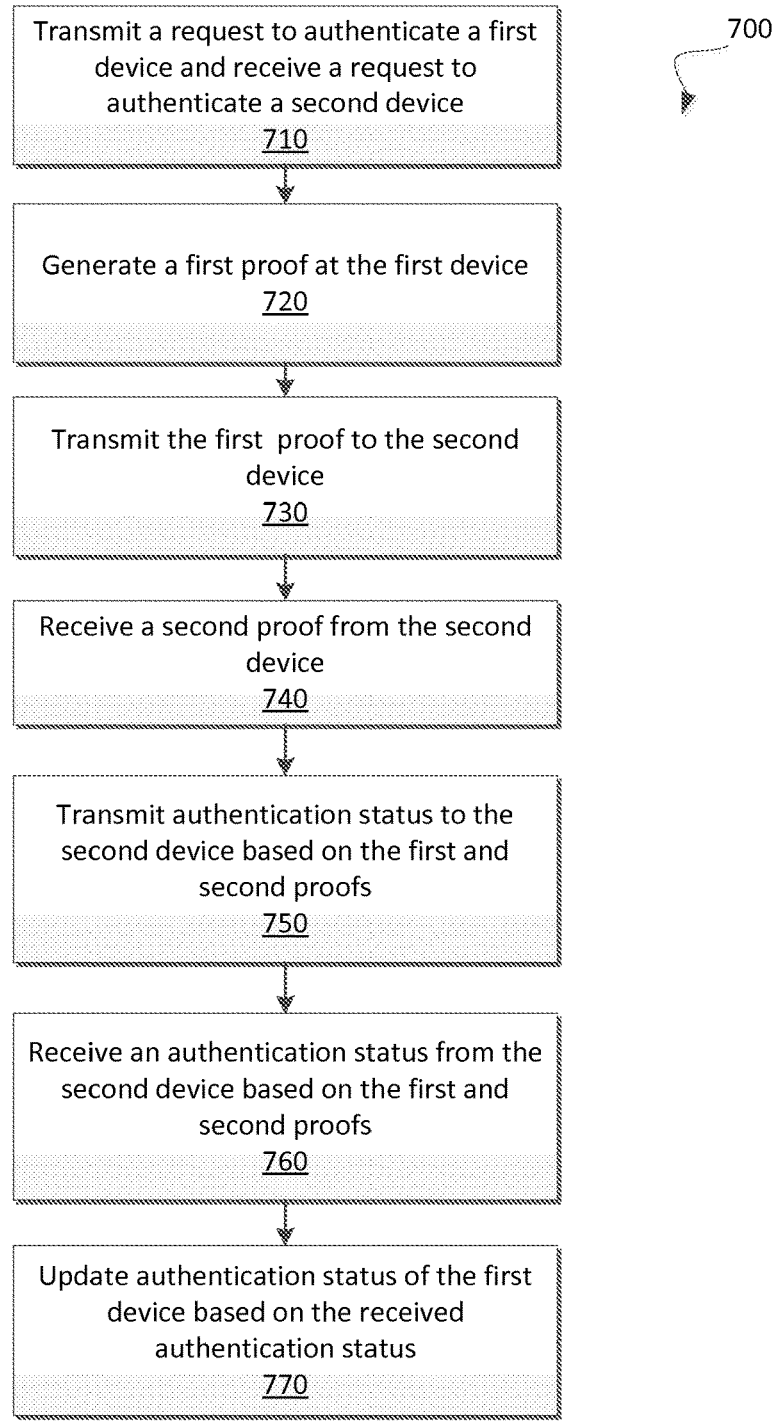
FIG. 7A is a flow diagram of an example method of a device that is performing operations as both a primary device and a secondary device in accordance with some embodiments.

FIG. 7A is a flow diagram of an example method 700 of a device that is performing operations as both a primary device and a secondary device in accordance with some embodiments. In general, the method 700 may be performed by processing logic that may comprise hardware (e.g., processing device, circuitry, dedicated logic, programmable logic, microcode, hardware of a device, etc.), software (e.g., instructions run or executed on a processing device), or a combination thereof. The authentication module 131 of FIG. 1 or the authentication module 300 of FIG. 3 may perform the method 700.

The method 700 may be performed by a first device that acts as both a primary device (e.g., a verifier) and a secondary device (e.g., a prover). For example, the method 700 may be used by a first device to transmit authentication information (e.g., a first proof) to a second device where the second device may authenticate the first device with the first proof. Furthermore, the first device may receive a second proof from the second device and may authenticate the second device with the second proof. Accordingly, the first device and the second device each provide a proof for authenticating itself with the other device as well as authenticate the other device with a proof provided by the other device.

As shown in FIG. 7A, the method 700 may begin with the processing logic transmitting a request to authenticate a first device and receiving a request to authenticate a second device. For example, a first device may transmit a request to be authenticated by the second device and the second device may similarly transmit a request to be authenticated by the first device. The processing logic may generate a first proof at the first device (block 720). For example, the first device may receive pairing data corresponding to the second device and may generate the first proof based on the received pairing data as previously described. The processing logic may then transmit the first proof to the second device (block 730). Furthermore, the processing logic may receive a second proof from the second device (block 740). For example, the second proof may be generated by the second device based on pairing data that corresponds to the first device. The processing logic may transmit an authentication status to the second device based on the first and second proofs (block 750). For example, if the first proof matches the second proof, then the authentication status may indicate that the second device has been successfully authenticated by the first device. Furthermore, the processing logic may receive an authentication status from the second device based on the first and second proofs (block 760). For example, the received authentication information may indicate that the first device has been successfully authenticated by the first device if the first proof received by the second device matches the second proof generated by the second device. Furthermore, the processing logic may update an authentication status of the first device based on the received authentication status (block 770). For example, certain functionality or capability of the first device may be enabled or unlocked.

Figure 7B:
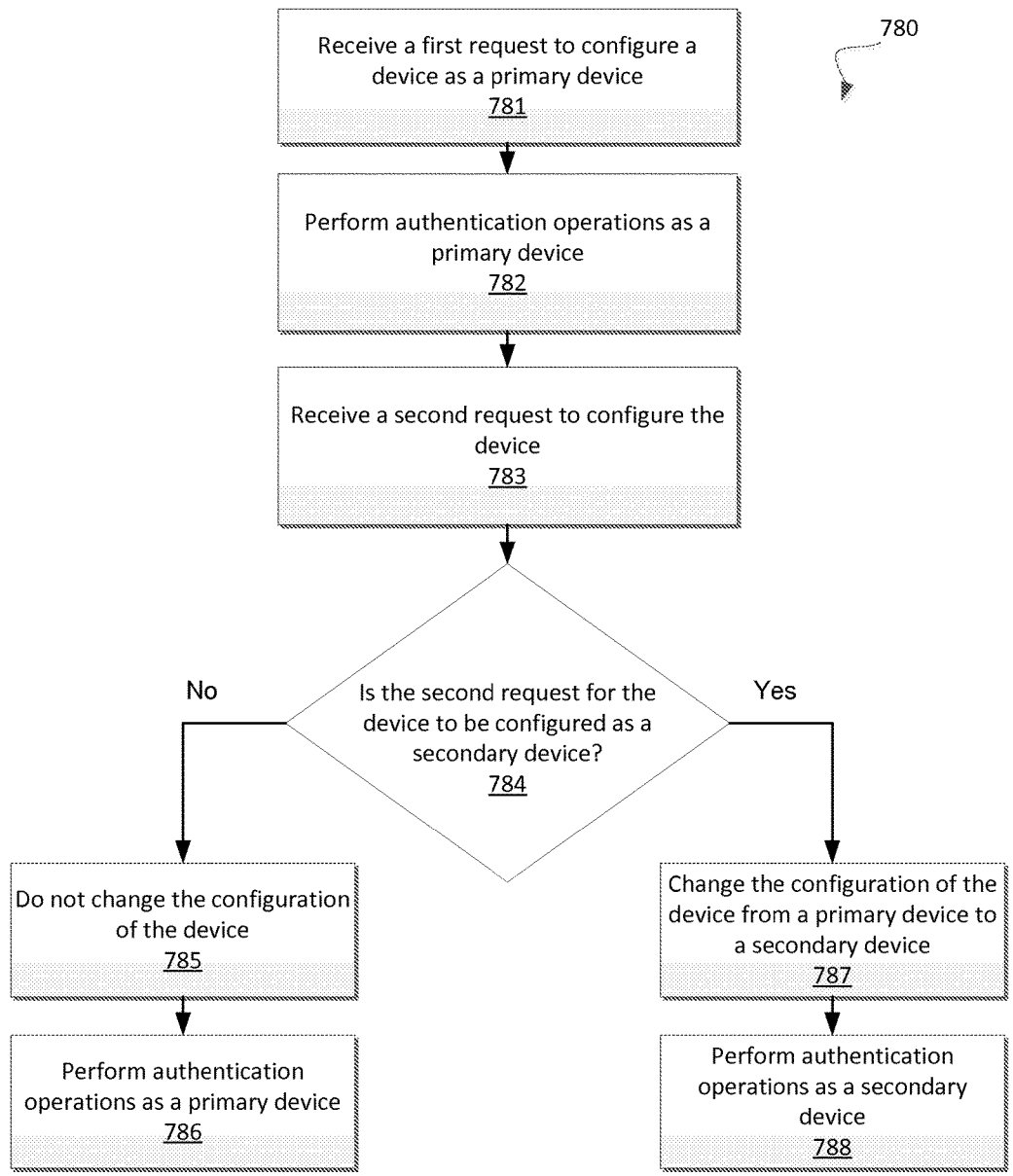
FIG. 7B is a flow diagram of an example method that configures a device as a primary device or a secondary device in accordance with some embodiments.

FIG. 7B is a flow diagram of an example method 780 that configures a device as a primary device or a secondary device. In general, the method 780 may be performed by processing logic that may comprise hardware (e.g., processing device, circuitry, dedicated logic, programmable logic, microcode, hardware of a device, etc.), software (e.g., instructions run or executed on a processing device), or a combination thereof. The authentication module 131 of FIG. 1 or the authentication module 300 of FIG. 3 may perform the method 780.

As described above in conjunction with FIG. 7A, a device may act as both a primary device and a secondary device. In some embodiments, the device may include functionality to act as both the primary device and the secondary device and may enable or configure functionality to act as either the primary device or the secondary device. For example, a device may include the functionality of both the primary device 410 and the secondary device 430 as described in conjunction with FIG. 4.

As shown in FIG. 7B, the method 780 may begin with the processing logic receiving a first request to configure a device as a primary device (block 781). In response to such a request, the device may be configured to perform authentication operations as the primary device (e.g., receive the pairing data from an authentication server and other such operations as previously described). The processing logic may perform authentication operations as a primary device (block 782). For example, the device may authenticate another device (e.g., the other device is a secondary device) where a successful authentication may allow the device to respond to certain operations or commands of the other device. The processing logic may further receive a second request to configure the device (block 783). For example, a subsequent request may be associated with configuring the device as a secondary device. The processing logic may determine if the second request is for the device to be configured as a secondary device (block 784). If the second request is not for the device to be configured as a secondary device, then the configuration of the device may not be changed (block 785). For example, the device may remain configured to operate as a primary device. As such, the processing logic may continue to perform authentication operations as a primary device (block 786). However, if the second request is for the device to be configured as a secondary device, then the configuration of the device may be changed from a primary device to a secondary device (block 787). Furthermore, the device may subsequently perform authentication operations a secondary device (block 788). For example, the device may attempt to seek authentication as a secondary device with another device where the other device performs the authentication operations as a primary device.

As such, a device may perform authentication operations as a primary device at a first time and the same device may later perform authentication operations as a secondary device at a second time. As an example, the device may be a mobile communications device (e.g., a mobile phone, tablet computer, etc.) that is configured to be a primary device when the mobile communications device is to interact with a peripheral device (e.g., a game controller, keyboard, etc.) and the same mobile communications device may be configured to be a secondary device when the mobile communications device is to interact with a server (e.g., an online game server). Accordingly, a single device may change from a primary device to a secondary device based on the other type of device or entity for which the single device is to interact.

Figure 8:
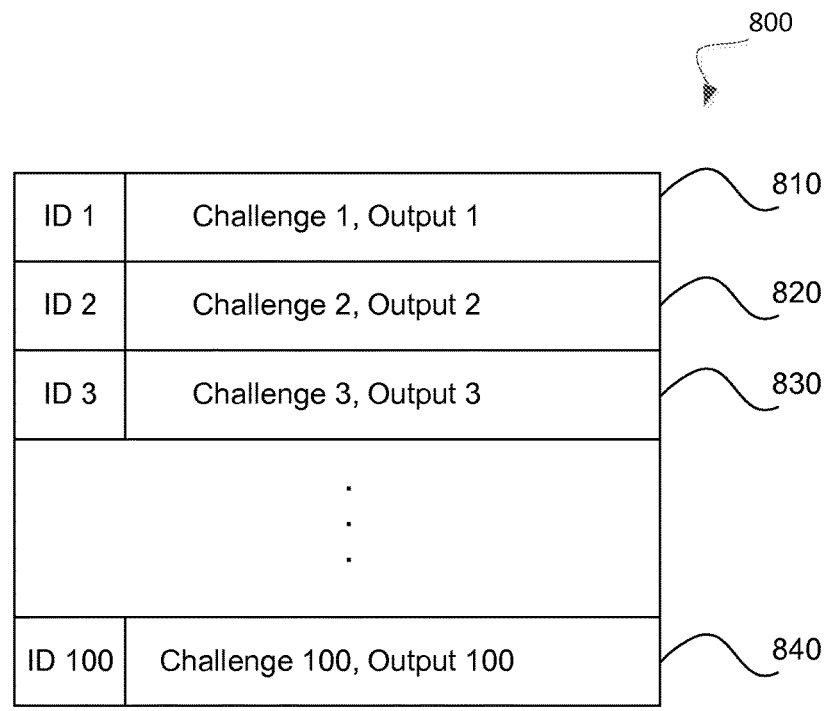
FIG. 8 illustrates an example memory storing pairing data at a server in accordance with some embodiments.

FIG. 8 illustrates an example memory 800 storing pairing data at a server in accordance with some embodiments. In general, the memory 800 may correspond to a memory at the authentication server 110 storing the pairing data 111 of FIG. 1.

As shown in FIG. 8, the memory 800 may store sets of a first challenge information and a first output value that correspond to a particular identification of a secondary device. For example, the entry 810 includes a first challenge information and a first output value. Furthermore, each of the entries 820, 830, and 840 further include a first challenge information and a first output value for different identifications associated with different secondary devices. Each of the output values for the entries 810, 820, 830, and 840 may be pre-computed by a server and stored in the memory 800. For example, the server may include hardware (e.g., a field programmable gate array or other circuitry) that may be used to perform the operations of a first cryptographic function that is also performed by the secondary device (e.g., the first function 440 of FIG. 4). The results of the first cryptographic function that is performed at the server may thus be stored in the memory 800 for each secondary device along with a paired or corresponding first challenge information. As such, the memory 800 may include multiple pairs of the first challenge information and the output value (e.g., the pairing data) where each pair is transmitted to the primary device when the primary device provides the unique identification of the secondary device that is to be authenticated.

For example, a secondary device associated with an identification of 'ID 2' may be received by the primary device. Furthermore, the primary device may request the pairing data associated with the identification of 'ID 2' from the authentication server. In response, the authentication server may retrieve the first challenge information of 'Challenge 2' and the first output value of 'Output 2' and transmit the pairing data to the primary device. The first challenge information of 'Challenge 2' may be transmitted to the secondary device as the first challenge information. The first output value of 'Output 2' may be used by the primary device to generate the proof and CCK. In some embodiments, the identification of 'ID 2' may be associated with a set of secondary devices. For example, the first challenge information of 'Challenge 2' and the first output value of 'Output 2' may be retrieved and transmitted if a secondary device is included in the set of secondary devices that are identified by 'ID 2.'

Aspects of the present disclosure may be used to ensure that a secondary device may require authentication with the primary device before operation of the secondary device may be initiated or before the secondary device may be used. For example, as an example, a printer cartridge (e.g., a secondary device) may require authentication with a printer (e.g., the primary device) before functionality or capability of the printer cartridge is enabled to allow the printer cartridge to be used. As another example, a video game console controller (e.g., a secondary device) may require authentication with a video game console (e.g., the primary device). The secondary device may be associated with a subset of functionality or capability that may only be enabled based on the authentication with the video game console. For example, the secondary device may only be allowed to interact with certain video games that are played on the video game console. The secondary device may be authenticated by the primary device to allow the secondary device to interact with the particular video games. Any other functionality or capability that may control a secondary device or may allow a secondary device to be used or interact with a primary device may require such authentication.

Additionally, as described above, a secondary device may be authenticated by a primary device. In some embodiments, the secondary device may be authenticated by multiple primary devices. Each of the primary devices may transmit, to a server, information identifying a successful authentication with the secondary device. For example, a first primary device may authenticate the secondary device and transmit to a server information identifying the secondary device being associated with a successful authentication. A second primary device may later authenticate the secondary device and transmit to the server additional information identifying that the secondary device has successfully authenticated with the second primary device. Accordingly, the server may identify that the first primary device and the second primary device have each successfully authenticated the same secondary device.

Figure 9:
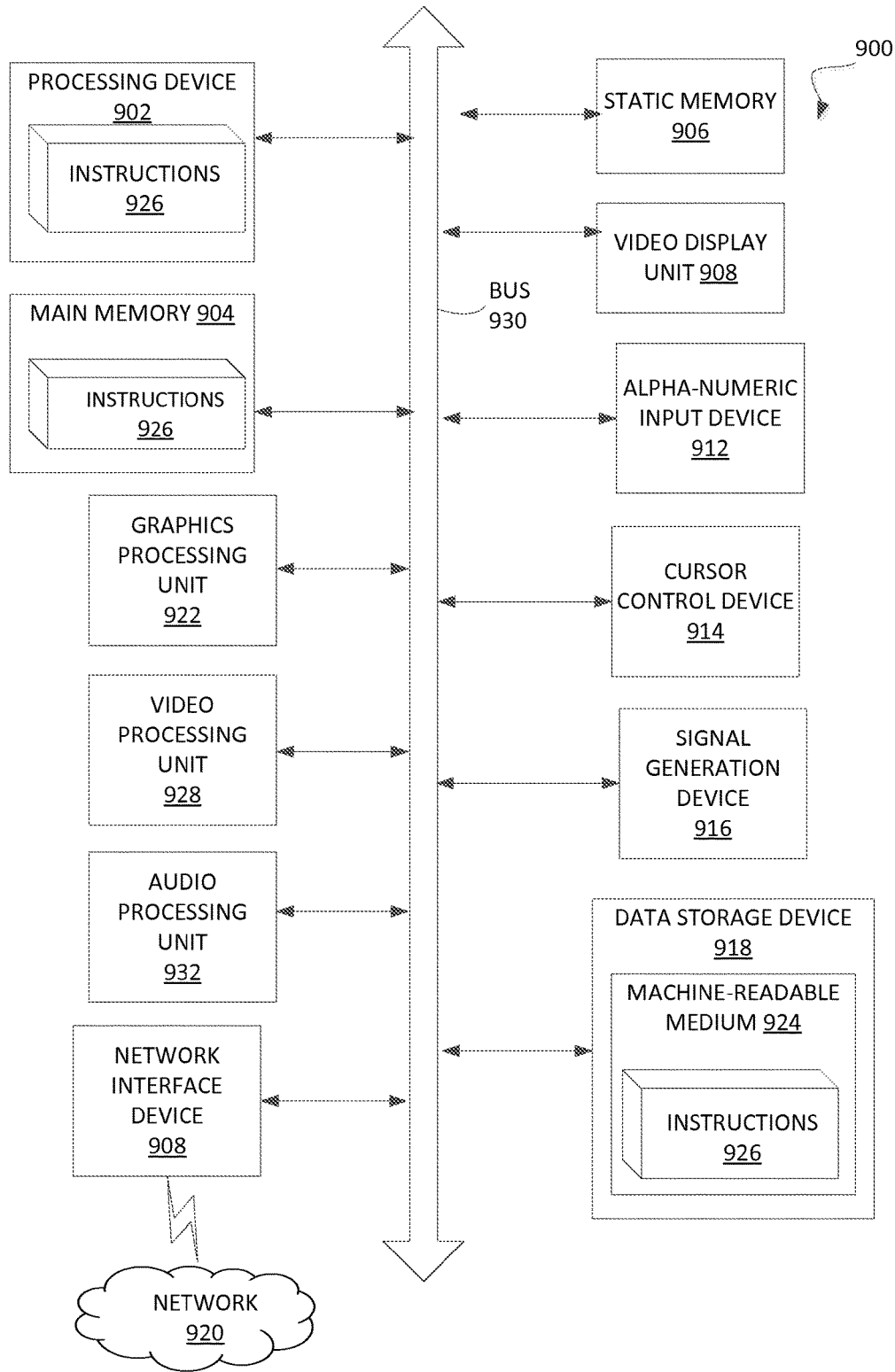
FIG. 9 illustrates a block diagram of an embodiment of a computer system in which some embodiments of the disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to a authentication module (e.g., authentication module 131 of FIG. 1 or authentication module 300 of FIG. 3). While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving, at a first device and from a server, pairing data associated with a second device, the pairing data comprising a first value and a second value, wherein the first value of the pairing data is associated with an output value generated by the second device;
   selecting, by the first device, a challenge information associated with the second device;
   generating a first authentication proof based on the first value of the pairing data received from the server and the challenge information selected by the first device;
   transmitting, by the first device, the second value of the pairing data to the second device;
   receiving, by the first device and from the second device, a second authentication proof that is based on the challenge information selected by the first device and the output value that is based on the second value of the pairing data received from the server and transmitted to the second device by the first device; and
   updating, by a processing device of the first device, an authentication status of the second device based on a comparison of the first authentication proof that is based on the first value of the pairing data received from the server and the second authentication proof that is received from the second device.

2. The method of claim 1, wherein the second value of the pairing data corresponds to an additional challenge information, the method further comprising:
   transmitting the additional challenge information from the first device to the second device after receiving the pairing data, wherein the second authentication proof is further based on the additional challenge information, and wherein the first authentication proof is based on the output value.

3. The method of claim 2, wherein the output value further corresponds to a cryptographic operation that is based on a key associated with the second device and the additional challenge information.

4. The method of claim 1, wherein updating the authentication status corresponds to allowing the second device to access a function of the first device when the first authentication proof matches the second authentication proof, and wherein the authentication status corresponds to not allowing the second device to access the function of the second device when the first authentication proof does not match the second authentication proof.

5. The method of claim 1, further comprising:
transmitting the challenge information from the first device to the second device, wherein the first authentication proof is based on a cryptographic function using the challenge information and the first value of the pairing data received from the server, and
wherein the second authentication proof is based on the same cryptographic function using the challenge information and the output value, wherein the output value is based on a key associated with the second device and the second value of the pairing data transmitted by the first device to the second device.

6. The method of claim 1, further comprising:
receiving a unique identification associated with the second device; and
transmitting, to the server, a request for the pairing data associated with the second device based on the unique identification associated with the second device.

7. The method of claim 1, wherein the first device is configured to respond to a particular command from the second device when the authentication status information indicates a successful authentication based on the comparison of the first authentication proof and the second authentication proof.

8. A system comprising:
a memory; and
a processing device operatively coupled with the memory and to:
receive a request from a secondary device for authentication of the secondary device;
receive pairing data from a server based on an identification of the secondary device, wherein the pairing data comprises a first portion of pairing data and a second portion of pairing data, wherein the first portion of the pairing data is associated with an output value generated by the secondary device;
select, by a primary device, a challenge information associated with the secondary device;
generate a first proof based on the first portion of the pairing data and the selected challenge information;
transmit the second portion of the pairing data to the secondary device;
receive, by the primary device, a second proof from the secondary device that is based on the output value, the output value being based on the second portion of the pairing data received from the server and transmitted to the secondary device and the challenge information selected by the primary device; and
authenticate the secondary device based on the first proof and the second proof.

9. The system of claim 8, wherein the challenge information corresponds to a random number, and wherein the processing device is further to:
generate the random number; and
transmit the random number to the secondary device, wherein the first proof is further based on the generated random number and the second proof is further based on the generated random number.

10. The system of claim 9, wherein the processing device is further to:
generate a first cryptographic check using a first cryptographic function operating with the generated random number and the first portion of the pairing data; and
transmit the first cryptographic check to the secondary device.

11. The system of claim 10, wherein the receiving of the second proof from the secondary device is in response to the first cryptographic check matching a second cryptographic check that is generated by the secondary device.

12. The system of claim 8, wherein the server is associated with a plurality of pairing data, and wherein one pairing data of the plurality of pairing data is received at the first device based on the identification of the secondary device.

13. The system of claim 12, wherein the processing device is further to:
transmit, to the server, information identifying an authentication status of the secondary device in view of the authentication of the secondary device that is based on the first proof and the second proof.

14. The system of claim 12, wherein the first portion of pairing data is a result of a cryptographic operation with a key associated with the secondary device and the second portion of the pairing data, and wherein the second proof is based on the same cryptographic operation.

15. A non-transitory computer readable medium including data that, when accessed by a processing device, cause the processing device to perform operations comprising:
receiving, at a first device and from a server, a first output value and a first challenge data associated with a second device, wherein the first output value is associated with a second output value generated by the second device;
generating a first authentication proof based on a first cryptographic operation between the first output value received from the server and a generated number from the first device;
transmitting, by the first device, the first challenge data to the second device;
receiving, by the first device and from the second device, a second authentication proof that is generated based on a plurality of cryptographic operations, the second output value that is based on the first challenge data received from the server and transmitted to the second device, and the generated number from the first device; and
updating an authentication status of the second device based on a comparison of the first authentication proof with the second authentication proof that is received from the second device.

16. The non-transitory computer readable medium of claim 15, the operations further comprising:
transmitting the generated number to the second device.

17. The non-transitory computer readable medium of claim 16, wherein the plurality of cryptographic operations that generates the second authentication proof comprises a second cryptographic operation to generate the second output value based on the first challenge data and a key associated with the secondary device, and the cryptographic operations that generates the second authentication proof further comprises the first cryptographic operation between the second output value and the generated number.

18. The non-transitory computer readable medium of claim 17, wherein second cryptographic operation is based on hardware of the secondary device and the first cryptographic operation is based on software.

19. The non-transitory computer readable medium of claim 15, wherein the generated number is selected by the first device.

20. The non-transitory computer readable medium of claim 15, wherein the generated number is randomly generated by the first device.

* * * * *